US012781851B2

(12) United States Patent
Lang et al.

(10) Patent No.: US 12,781,851 B2
(45) Date of Patent: Nov. 3, 2026

(54) SHIFTING APPARATUS AND TOWING VEHICLE

(71) Applicant: DEERE & COMPANY, Moline, IL (US)

(72) Inventors: Matthias Lang, Mannheim (DE); Thomas Busold, Bruehl (DE); Mario Kaiser, Mannheim (DE); Karl Pfeil, Frankenthal (DE); Volker Kegel, Mannheim (DE); Joerg Frech, Mutterstadt (DE); David Mueller, Dettenheim (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 18/966,271

(22) Filed: Dec. 3, 2024

(65) Prior Publication Data

US 2025/0230873 A1 Jul. 17, 2025

(30) Foreign Application Priority Data

Jan. 17, 2024 (DE) ........................ 102024101274.9

(51) Int. Cl.
*F16H 63/30* (2006.01)
*F16H 63/10* (2006.01)

(52) U.S. Cl.
CPC ......... *F16H 63/3023* (2013.01); *F16H 63/10* (2013.01); *F16H 2063/3079* (2013.01)

(58) Field of Classification Search
CPC ................ F16H 63/3023; F16H 63/10; F16H 2063/3079; F16H 61/30; F16H 2061/004; B60Y 2200/221
See application file for complete search history.

(56) References Cited

U.S. PATENT DOCUMENTS 2,432,712 A * 12/1947 Bachman ................ F16H 61/30
74/484 R
3,230,792 A * 1/1966 Keiley ................ F16H 61/0276
192/85.48
(Continued)

FOREIGN PATENT DOCUMENTS

CH 0540793 A 8/1973
DE 102006052239 A1 5/2008
(Continued)

OTHER PUBLICATIONS

English Translation of EP-2466171-A1 (Year: 2012).*
(Continued)

*Primary Examiner* — Victor L Macarthur
(74) *Attorney, Agent, or Firm* — Hanley, Flight & Zimmerman, LLC

(57) ABSTRACT

The disclosure relates to a shifting apparatus for shifting gear stages of a vehicle transmission. The shifting apparatus comprises at least one selector rod which is translationally movable along a shifting direction and the two rod free ends of which are mounted in a manner which can be loaded hydraulically in each case in a pressure chamber for hydraulic medium. The shifting apparatus has a pressure connector and a hydraulic pressure line which is connected to it at each pressure chamber. Moreover, a tank connector and a hydraulic return line which is connected to it are arranged at each pressure chamber. The two return lines open into a common tank line for connection to a hydraulic tank. Moreover, the disclosure relates to a towing vehicle with a shifting apparatus of this type.

20 Claims, 2 Drawing Sheets

(56) References Cited

U.S. PATENT DOCUMENTS

| | | | | |
|---|---|---|---|---|
| 3,793,898 | A * | 2/1974 | Espenschied | F16H 61/30 74/335 |
| 5,667,052 | A * | 9/1997 | Richardson | F16H 63/3023 192/52.4 |
| 9,933,065 | B2 | 4/2018 | Makita et al. | |
| 10,907,732 | B2 | 2/2021 | Kidachi et al. | |
| 2015/0008350 | A1 | 1/2015 | Kraft et al. | |
| 2025/0230873 | A1 * | 7/2025 | Lang | F16H 63/10 |

FOREIGN PATENT DOCUMENTS

| | | | | |
|---|---|---|---|---|
| DE | 102006058913 | A1 | 6/2008 | |
| DE | 102011011009 | A1 | 8/2012 | |
| DE | 102010064543 | B3 | 9/2019 | |
| DE | 102022001618 | B3 | 8/2023 | |
| EP | 0071698 | A2 * | 2/1983 | F16F 13/28 |
| EP | 2466171 | A1 * | 6/2012 | F16H 61/688 |

OTHER PUBLICATIONS

English Translation of EP-0071698-A2 (Year: 1983).*
Extended European Search Report and Written Opinion issued in European Patent Application No. 25151625.8 dated May 14, 2025, in 10 pages.

* cited by examiner

SHIFTING APPARATUS AND TOWING VEHICLE

CROSS-REFERENCE TO RELATED APPLICATIONS

This application claims priority to German Patent Application No. 102024101274.9, filed Jan. 17, 2024, which is hereby incorporated by reference.

TECHNICAL FIELD

The present disclosure relates generally to a shifting apparatus for shifting gear stages of a vehicle transmission with at least one selector rod which can be loaded hydraulically. Furthermore, the disclosure relates to a towing vehicle with a shifting apparatus of this type.

BACKGROUND

In the case of vehicle transmissions, it is known for shifting gear stages for a slider sleeve to be moved axially by means of a selector fork and a selector rod which is fastened to it. The movement necessary to this end of the selector rod can be achieved by the latter being capable of being loaded with hydraulic pressure at the two rod free ends. The shifting behavior is dependent here on different hydraulic and mechanical factors.

SUMMARY

It is an object of the present disclosure to propose a shifting apparatus and a towing vehicle which make a reliable shifting behavior during travel operation possible by way of simple technical means.

This object is achieved by way of a shifting apparatus with the features of one or more embodiments disclosed herein and a towing vehicle with the features of one or more embodiments disclosed herein.

In accordance with one or more embodiments disclosed herein, a shifting apparatus for a gear shifter of a vehicle transmission is proposed, which shifting apparatus comprises at least one selector rod which is translationally movable along a shifting direction. In order to realise the translational movement, the two rod free ends of the selector rod can be loaded hydraulically and, to this end, are each mounted in a pressure chamber. Each pressure chamber has a pressure connector and a hydraulic pressure line which is connected to it. Hydraulic medium (for example, oil) passes by way of this into the pressure chambers, in order for it to be possible for the two rod free ends to be loaded with hydraulic pressure in a manner which is dependent on the desired shifting position of the selector rod. Moreover, each pressure chamber has a tank connector and a hydraulic return line which is connected to it. The two return lines open into a common tank line which can be connected to a hydraulic tank.

The tank line which is common to the two pressure chambers provides stable physical preconditions in a technically simple way for precise pressure conditions in the two hydraulic chambers. Undesired axial movements of the selector rod which are brought about by way of imprecise pressure conditions, with a correspondingly less favorable shifting quality, can be avoided in a relatively simple way. Any accidental incorrect positions of the selector rod can thus be avoided in a relatively technically uncomplicated manner. Since the pressure conditions have effects on the position of the selector rod, the movement tolerances for the selector rod which are required for the different shifting positions (neutral middle position or one of two possible gear shifting positions) can be of smaller dimensions. Even in the case of relatively great unexpected pressure changes (rise or fall) in the hydraulic circuit of the shifting apparatus, any accidental incorrect positions of the selector rod can be avoided without additional special technical complexity.

The shifting apparatus can be equipped with one selector rod or a plurality of selector rods in a manner which is dependent on the number of gears to be shifted. All the selector rods may be combined with the same technical features, as disclosed using the single selector rod. If no gear is to be shifted by way of a selector rod, the hydraulic loading of the two rod free ends transfers the selector rod into a neutral middle position. A different gear is then possibly shifted by means of another selector rod.

The shifting apparatus can be mounted inside or outside a transmission housing.

In one embodiment, a valve unit is integrated into the common tank line, with the result that this valve unit can act hydraulically on the two pressure chambers as a common technical functional component. Since this is a joint valve unit for the two return lines, the disadvantages associated with in each case one valve unit on the two return lines are avoided.

The valve unit makes it possible to assist or to regulate desired pressure conditions in the two pressure chambers by way of simple technical means. For example, the valve unit is configured as a shut-off valve which can prevent an undesired outflow of the hydraulic medium from the pressure chambers. It is advantageous here that the common shut-off valve avoids the disadvantages which would result from tolerances existing due to manufacture between two shut-off valves which would each be assigned to one return line. Thus, for instance, the shut-off pressure to be overcome by the outflowing hydraulic flow would be different in the case of the two shut-off valves of the same selector rod. This would require greater dimensioning of the necessary movement play for the selector rod, in order to always ensure the correct position (neutral middle position or one of the two possible gear shifting positions) even in the case of an unexpected pressure rise or pressure drop. By way of the common shut-off valve, in contrast, accidental incorrect positions of the selector rod can be avoided with at the same time small dimensioning of the movement tolerances for the selector rod.

The valve unit is configured as a check valve, the through-flow direction of which is oriented so as to face away from the tank connectors. Therefore, the shut-off direction of the check valve is oriented so as to face the tank connectors. At the valve unit, this ensures a shut-off pressure in the direction of the tank connectors which, for example, in the rest state of the shifting apparatus or a vehicle standstill, prevents an undesired outflow of the hydraulic medium from the pressure chambers and therefore an undesired inlet of air into the pressure chambers. This assists a technically high-quality shifting behavior of the gear change during the next start of the towing vehicle and vehicle transmission.

The check valve is advantageously configured such that it is loaded with spring force and can be provided as a technically reliable standard component.

As an alternative, the check valve is configured as a gravity valve. This technically simple valve construction is appropriate, for example, in the case of a hydraulic shifting apparatus, in the case of which the hydraulic medium flows out from the pressure chambers to a hydraulic tank against gravity.

In a further embodiment, an air channel is provided which is arranged on the selector rod and/or on a chamber wall, tangent to the selector rod, of the respective hydraulic chamber. As a result, air which is contained in the hydraulic chambers can be displaced and discharged in a technically simple and reliable manner when the hydraulic chambers are filled with hydraulic medium. This assists a high-quality shifting behavior.

The air channel is arranged, for example, in a highest region (against gravity) of the selector rod and/or the chamber wall. This facilitates an efficient discharge of the undesired air from the hydraulic chambers, since the gaseous air is lighter than the hydraulic medium.

The air channel is configured as a recess, in particular in the manner of a groove. The air channel, in particular the recess, is arranged and/or configured on a surface of the selector rod and/or on a surface of the chamber wall of the hydraulic chamber. Specifically, the air channel, in particular the recess, can be arranged and/or configured on an outer rod surface of the selector rod and/or on an inner wall surface of the chamber wall of the hydraulic chamber. This air channel can be provided structurally with low production complexity on the selector rod and/or the chamber wall.

The air channel can have different cross sections. For example, the cross sections may include triangular or an arcuate (e.g., semicircular) cross sections. Cross sections of this type can be produced precisely with low complexity.

Furthermore, the disclosure relates to a towing vehicle, in particular an agricultural towing vehicle, with a shifting apparatus as described in one or more embodiments disclosed herein. The towing vehicle, preferably a tractor, can comprise, moreover, a drive engine, in particular an internal combustion engine. Here, a transmission arrangement of the towing vehicle can be capable of being driven by the drive engine and can be drive-connected to at least one vehicle axle of the towing vehicle and/or can be capable of being drive-connected to a further drive axle of the towing vehicle. The towing vehicle according to the disclosure has the above-described advantages of the shifting apparatus according to the disclosure.

The shifting apparatus can be mounted inside or outside a housing of the transmission arrangement.

The towing vehicle according to the disclosure makes a high quality and precise shifting behavior during shifting of individual gears possible in a technically simple way and, as a result, also assists driving operation which is comfortable for the vehicle driver.

Other features and aspects will become apparent by consideration of the detailed description, claims, and accompanying drawings.

BRIEF DESCRIPTION OF THE DRAWINGS

The shifting apparatus according to the disclosure will be explained in greater detail in the following text using the appended drawings. Here, components which are corresponding or comparable with regard to their function are identified by the same designations.

Like reference numerals are used to indicate like elements throughout the several figures.

DETAILED DESCRIPTION

Figure 1:
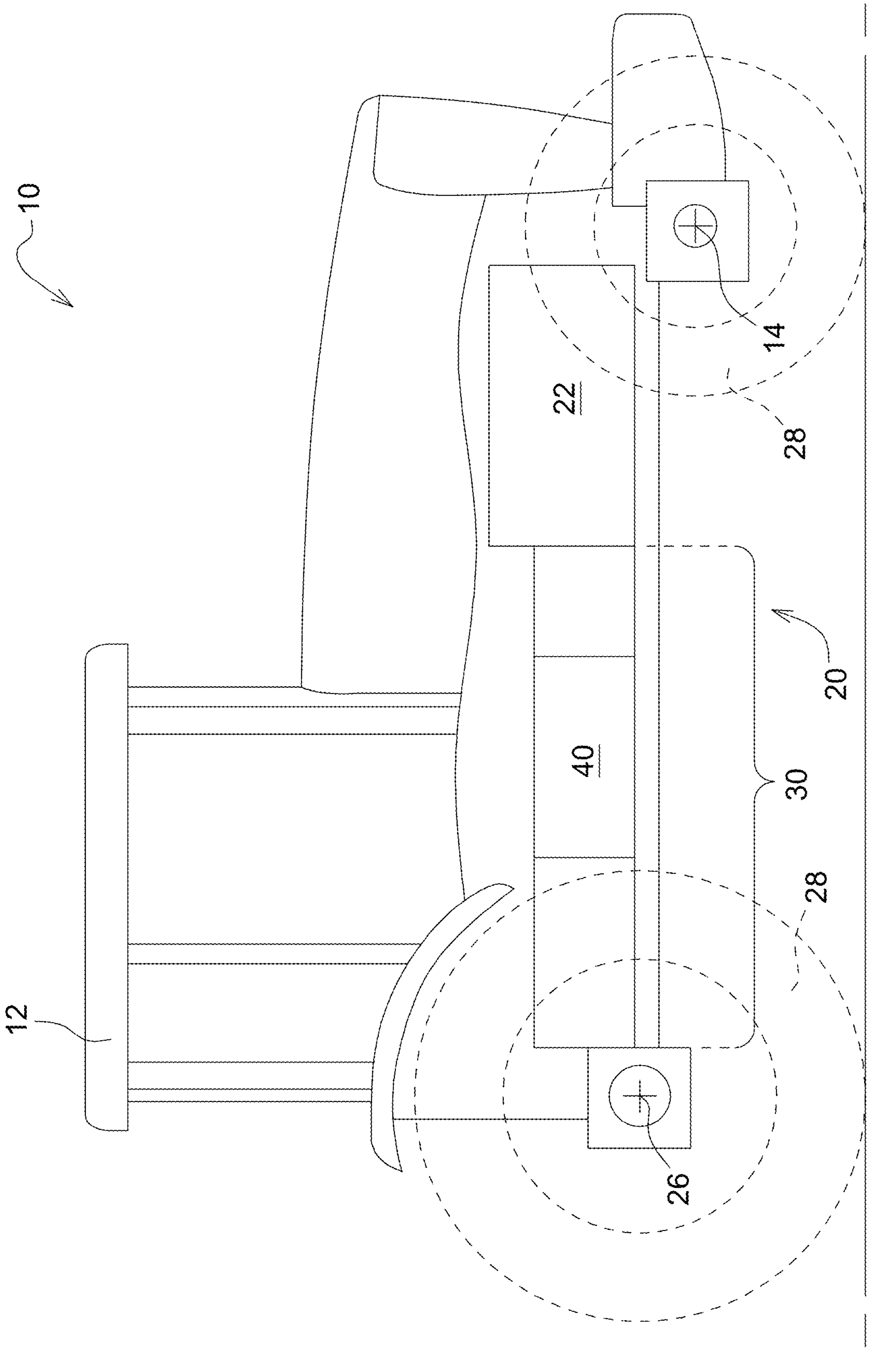
FIG. 1 shows a diagrammatic illustration of an agricultural towing vehicle according to the disclosure.

FIG. 1 shows a diagrammatic illustration of an agricultural towing vehicle 10 according to the disclosure, in particular in the form of a tractor, with a drive train 20 in one possible embodiment. The basic design of an agricultural towing vehicle 10 is assumed to be known to a person skilled in the art. The towing vehicle 10 also comprises a cab 12, a front vehicle axle 14, and a rear vehicle axle 26. The front vehicle axle 14 and the rear vehicle axle 26 are part of the drive train 20, with it being possible for the rear vehicle axle 26 generally to be permanently driven and the front vehicle axle 14 generally to be activatable on demand.

Furthermore, the drive train 20 comprises a drive engine 22 which can be configured as an internal combustion engine, and a transmission structure which can be assembled from different individual transmission components. The transmission structure can have a transmission arrangement 30 in the power and torque flow, starting from the drive engine 22. The transmission arrangement 30 is drive-connected to the drive engine 22 and/or can be capable of being driven to the drive engine 22.

Drive power of the drive engine 22 can be transmitted by way of the transmission arrangement 30 with different gear stages to an output shaft. The rear vehicle axle 26, which is drive-connected to the output shaft and converts a rotation of the front and/or the rear vehicle axle (via ground engagement means connected thereto) into propulsion of the tractor, is therefore driven at a different rotational speed depending on a gear stage selected in the transmission arrangement 30. Consequently, a tractor equipped with the transmission arrangement 30 is movable in different speed ranges depending on the gear stage selected in the transmission arrangement 30.

The towing vehicle 10 can have one or more ground engagement means in the form of wheels 28 which are in engagement with an underlying surface to transmit drive forces and/or by way of which the towing vehicle 10 is supported on the underlying surface. The towing vehicle 10 can, moreover, have a chassis, it being possible for the chassis in particular to be supported by the wheels suspended on the front and the rear vehicle axle 14, 26.

Figure 2:
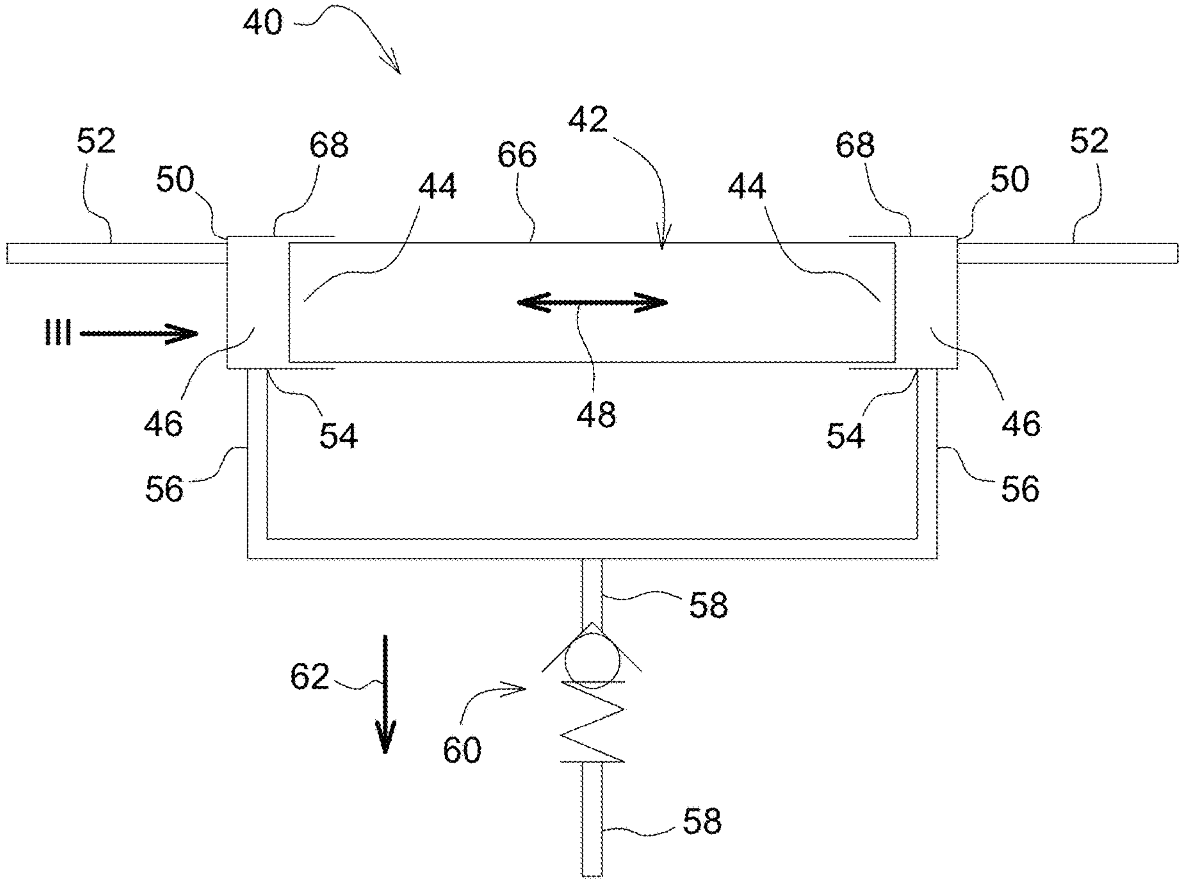
FIG. 2 shows a diagrammatic side view of the shifting apparatus according to the disclosure.

FIG. 2 shows a shifting apparatus 40 with at least one selector rod 42. All selector rods 42 which are present are preferably combined with the same technical features, as described in the following text on the basis of the single selector rod 42.

The shifting apparatus 40 can be mounted inside or outside a housing of the transmission arrangement 30. The shifting apparatus 40 is coupled to the transmission arrangement 30 in order to shift different gear stages, for example, in such a way that the hydraulically loaded selector rod 42 displaces a slider sleeve, mounted on a transmission output shaft, axially via a selector fork which is fastened to it.

The selector rod 42 has two rod free ends 44 which lie axially opposite one another and are each mounted in a pressure chamber 46. The two rod free ends 44 can be loaded by means of hydraulic pressure, in order to bring about a specific or defined movement along an axial direction 48 of the selector rod 42. The axial direction 48 which acts as shifting direction of the selector rod 42 can achieve the shifting of a gear stage or a transfer of the selector rod 42 into a neutral middle position. The neutral middle position is shown in FIG. 2. Starting from this middle position, the selector rod 42 can be moved either to the left or to the right in a manner which is dependent on the hydraulic pressure loading, in order to assume one gear shifting position of two possible gear shifting positions, which brings about the shifting of a gear stage.

For the pressure loading of the rod free ends 44 by way of a hydraulic medium (for example, oil), each pressure chamber 46 has a pressure connector 50 with a pressure line 52 which is connected to it. For the return of the hydraulic medium to a hydraulic tank (not shown here), the pressure chambers 46 each have a tank connector 54 and a return line 56 which is connected to it. The two return lines 56 open into a tank line 58 which leads to the hydraulic tank and into which a common valve unit 60, for example, a check valve, loaded with spring force, is integrated. A throughflow direction 62 of the valve unit 60 which acts as a shut-off valve is oriented so as to face way from the tank connectors 54.

Figure 3:
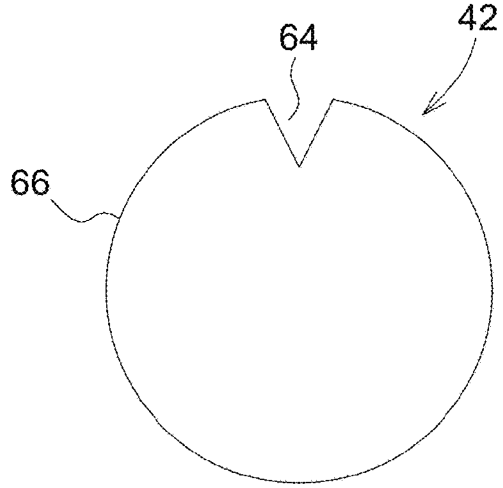
FIG. 3 shows a diagrammatic view of a selector rod of the shifting apparatus according to the arrow direction III in FIG. 2.

FIG. 3 shows a side view of the selector rod 42 along the arrow direction III in FIG. 2. An air channel 64 which runs parallel to the axial direction 48 is arranged on the selector rod 42. Here, the air channel 64 is arranged in a highest region, against gravity, of the selector rod 42 on its outer surface 66, in order to discharge undesired air or gas from the hydraulic chambers 46 as efficiently as possible. The air channel 64 is configured as a recess, for example, a groove, and has a triangular cross section in the exemplary embodiment. In further embodiments (not shown here), an arcuate, in particular semicircular, cross section can be provided, for example.

As an alternative or in addition to the air channel 64, an air channel (not shown here) which brings about the above-mentioned discharge of the air or the gas or assists it in combination with the air channel 64 can be arranged on an inner side of a chamber wall 68 of the respective pressure chamber 46. The chamber wall 68 which has an air channel of this type is tangent to the selector rod 42. The air channel is once again arranged here in a highest region, against gravity, of the chamber wall 68.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A shifting apparatus for shifting gear stages of a vehicle transmission, comprising:

- a selector rod translationally movable along a shifting direction and having two rod free ends, the two rod free ends mounted in respective pressure chambers and loaded hydraulically by hydraulic medium in the respective pressure chambers;
- two pressure connectors at the respective pressure chambers;
- two hydraulic pressure lines connected to the respective pressure chambers via the respective two pressure connectors;
- two tank connectors at the respective pressure chambers;
- two return lines connected to the respective pressure chambers via the respective two tank connectors, the two return lines opening into a common tank line for connection to a hydraulic tank;
- a valve fluidly coupled to the two return lines via the common tank line; and
- an air channel defined in the selector rod, the air channel extending from inside the respective pressure chambers to a location outside of the respective pressure chambers.

2. The shifting apparatus of claim 1, wherein the valve includes a shut-off valve.

3. The shifting apparatus of claim 1, wherein the valve includes a check valve, a throughflow direction of the check valve oriented so as to face away from the two tank connectors.

4. The shifting apparatus of claim 3, wherein the check valve is loaded with spring force.

5. The shifting apparatus of claim 3, wherein the check valve is configured as a gravity valve.

6. The shifting apparatus of claim 1, wherein the air channel is a first air channel, further including a second air channel arranged on a chamber wall of one of the respective pressure chambers.

7. The shifting apparatus of claim 1, wherein the air channel is arranged in a highest region of the selector rod.

8. The shifting apparatus of claim 1, wherein the air channel is configured as a recess.

9. The shifting apparatus of claim 1, wherein the air channel is arranged on at least one of a surface of the selector rod.

10. The shifting apparatus of claim 9, wherein the surface is a curved surface of the selector rod.

11. The shifting apparatus of claim 1, wherein the air channel has a triangular cross section.

12. The shifting apparatus of claim 1, wherein the air channel has an arcuate cross section.

13. The shifting apparatus of claim 1, wherein the air channel is configured as a groove on a curved surface of the selector rod.

14. The shifting apparatus of claim 13, wherein the groove extends an axial length of the selector rod.

15. The shifting apparatus of claim 1, wherein the air channel enables discharge of air from the respective pressure chambers to the location outside of the respective pressure chambers.

16. An agricultural towing vehicle, comprising a shifting apparatus including:

- selector rod translationally movable along a shifting direction and having a two rod free ends, the two rod free ends mounted in respective pressure chambers and loaded hydraulically by hydraulic medium in the respective pressure chambers;
- two pressure connectors at the respective pressure chambers;
- two hydraulic pressure lines connected to the respective pressure chambers via the respective two pressure connectors;
- two tank connectors at the respective pressure chambers;
- two return lines connected to the respective pressure chambers via the respective two tank connectors, the two return lines opening into a common tank line for connection to a hydraulic tank;
- a valve fluidly coupled to the two return lines via the common tank line; and
- an air channel defined in the selector rod, the air channel extending from inside the respective pressure chambers to a location outside of the respective pressure chambers.

17. The shifting apparatus of claim 1, wherein the two return lines are directly coupled to one another upstream of the valve.

18. The shifting apparatus of claim 1, wherein the valve is to restrict outflow of fluid from the respective pressure chambers.

19. The shifting apparatus of claim 1, wherein the two return lines are continuous between the common tank line and the respective pressure chambers.

20. An apparatus comprising:

a first pressure chamber;

a second pressure chamber;

a first hydraulic pressure line fluidly coupled to the first pressure chamber;

a second hydraulic pressure line fluidly coupled to the second pressure chamber;

a selector rod having a first end positioned in the first pressure chamber and a second end positioned in the second pressure chamber, the second end opposite the first end;

a first return line fluidly coupled to the first pressure chamber;

a second return line fluidly coupled to the second pressure chamber;

a valve fluidly coupled to the first and second return lines via a common tank line; and an air channel defined in the selector rod, the air channel extending from inside the first and second pressure chambers to a location outside of the first and second pressure chambers.

* * * * *